United States Patent
Dai et al.

(10) Patent No.: US 12,470,897 B2
(45) Date of Patent: Nov. 11, 2025

(54) METHODS AND APPARATUSES FOR MULTICAST AND BROADCAST SERVICES

(71) Applicant: Lenovo (Beijing) Limited, Beijing (CN)

(72) Inventors: Mingzeng Dai, Shanghai (CN); Congchi Zhang, Shanghai (CN); Joachim Löhr, Wiesbaden (DE); Hyung-Nam Choi, Ottobrunn (DE); Prateek Basu Mallick, Dreieich (DE); Lianhai Wu, Beijing (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 341 days.

(21) Appl. No.: 18/257,375

(22) PCT Filed: Dec. 15, 2020

(86) PCT No.: PCT/CN2020/136417
§ 371 (c)(1),
(2) Date: Jun. 14, 2023

(87) PCT Pub. No.: WO2022/126359
PCT Pub. Date: Jun. 23, 2022

(65) Prior Publication Data
US 2024/0031776 A1    Jan. 25, 2024

(51) Int. Cl.
*H04W 4/06* (2009.01)
*H04W 76/27* (2018.01)
(Continued)

(52) U.S. Cl.
CPC ............. *H04W 4/06* (2013.01); *H04W 76/27* (2018.02); *H04W 76/40* (2018.02); *H04L 12/189* (2013.01)

(58) Field of Classification Search
CPC ................................. H04L 12/50; H04L 12/28
(Continued)

(56) References Cited

U.S. PATENT DOCUMENTS

| | | | |
|---|---|---|---|
| 2016/0157218 A1* | 6/2016 | Nam | H04B 7/0639 370/329 |
| 2020/0077463 A1 | 3/2020 | Hong | |
| 2023/0049535 A1* | 2/2023 | Wang | H04W 72/232 |

FOREIGN PATENT DOCUMENTS

CN    111901763 A    11/2020

OTHER PUBLICATIONS

Huawei , "Summary of [AT112-e][036][MBS] SA2 LS on MBS", 3GPP TSG-RAN WG2 Meeting #112-e, R2-2011022, Electronic [retrieved Jul. 31, 2023]. Retrieved from the Internet <https://www.3gpp.org/ftp/TSG_RAN/WG2_RL2/TSGR2_112-e/Docs>., Nov. 2020, 21 Pages.

(Continued)

*Primary Examiner* — Dang T Ton
(74) *Attorney, Agent, or Firm* — FIG. 1 Patents

(57) ABSTRACT

Embodiments of the present disclosure relate to methods and apparatuses for multicast and broadcast services (MBS). According to an embodiment of the present disclosure, a method may include: determining whether a user equipment (UE) in an RRC_IDLE state or RRC_INACTIVE state should enter an RRC_CONNECTED state for reception of at least one MBS session; and transmitting indication information for indicating whether the UE should enter the RRC_CONNECTED state.

20 Claims, 5 Drawing Sheets

(51) Int. Cl.
*H04W 76/40* (2018.01)
*H04L 12/18* (2006.01)

(58) Field of Classification Search
USPC .................. 370/329, 400, 401, 402, 405
See application file for complete search history.

(56) References Cited

OTHER PUBLICATIONS

PCT/CN2020/136417 , "International Preliminary Report on Patentability", PCT Application No. PCT/CN2020/136417, Jun. 29, 2023, 6 pages.
PCT/CN2020/136417 , "International Search Report and Written Opinion", PCT Application No. PCT/CN2020/136417, Aug. 27, 2021, 7 pages.
Qualcomm Inc , "NR Multicast-Broadcast services and configuration for UEs in different RRC states", 3GPP TSG-RAN WG2 Meeting #112e, R2-2009038, E-Meeting [retrieved Jul. 31, 2023]. Retrieved from the Internet <https://www.3gpp.org/ftp/TSG_RAN/WG2_RL2/TSGR2_112-e/Docs>., Nov. 2020, 7 Pages.
20965377.3 , "Extended European Search Report", EP Application No. 20965377.3, Aug. 14, 2024, 11 pages.
CATT , "MBS reception of Idle and In-active UEs", 3GPP TSG-RAN WG3 #110 electronic, R3-206309, Online, Nov. 2020, 4 pages.
Intel Corporation , "MBS L2 Architecture, user plane and control plane", 3GPP TSG-RAN WG2 Meeting #112-e, R2-2009196, Electronic meeting, Nov. 2020, 9 pages.
ZTE , "Consideration on the control information in NR MBS", 3GPP TSG-RAN WG3 #109-e, R3-205248, Online, Aug. 2020, 4 pages.

\* cited by examiner

METHODS AND APPARATUSES FOR MULTICAST AND BROADCAST SERVICES

TECHNICAL FIELD

Embodiments of the present disclosure are generally related to wireless communication technologies, and more particularly, related to methods and apparatuses for multicast and broadcast services (MBS).

BACKGROUND

The work item on new radio (NR) support of MBS was agreed in Release 17 (e.g., RP-201038), wherein three radio resource control (RRC) states, i.e., RRC_IDLE state, RRC_INACTIVE state, and RRC_CONNECTED state will be supported in MBS. For RRC_IDLE state and RRC_INACTIVE state, MBS configuration information may be provided in a multicast control channel (MCCH) or broadcast control channel (BCCH). For RRC_CONNECTED state, MBS configuration information may be provided to a user equipment (UE) by RRC dedicated signaling directly.

In addition, two modes are specified for NR MBS delivery. One delivery mode is provided to meet high quality of service (QoS) requirement (e.g., high reliability, low latency, etc.), and is available to a UE in RRC_CONNECTED state. The other delivery mode is provided to meet low QoS requirement, where a UE can receive MBS data in RRC_IDLE state and RRC_INACTIVE state. A UE in RRC_IDLE state or RRC_INACTIVE state may need to enter RRC_CONNECTED state for receiving an MBS session with high QoS requirement. Thus, it is needed to develop solutions so that the network side can notify the UE to enter RRC_CONNECTED state or to stay in RRC_IDLE state or RRC_INACTIVE state for receiving at least one MBS session.

SUMMARY OF THE DISCLOSURE

One objective of the present disclosure is to provide methods and apparatuses for MBS, especially for RRC state transition (e.g., from RRC_IDLE state or RRC_INACTIVE state to RRC_CONNECTED state) for MBS.

According to some embodiments of the present disclosure, a method may include: determining whether a UE in an RRC_IDLE state or RRC_INACTIVE state should enter an RRC_CONNECTED state for reception of at least one MBS session; and transmitting indication information for indicating whether the UE should enter the RRC_CONNECTED state.

In some embodiments of the present disclosure, the indication information is for indicating that the UE should enter the RRC_CONNECTED state for reception of the at least one MBS session, or that the UE should stay in the RRC_IDLE state or RRC_INACTIVE state for reception of the at least one MBS session.

In some embodiments of the present disclosure, the indication information may include an MBS state indication in a short message associated with a group paging for the at least one MBS session.

In some other embodiments of the present disclosure, the indication information may include an MBS change indication in a short message for indicating whether MBS configuration information changes and an MBS state indication in the MBS configuration information. The MBS configuration information can be provided in a system information block (SIB).

In some embodiments of the present disclosure, the MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session. In some other embodiments of the present disclosure, the MBS state indication for indicating that the UE should enter the RRC_CONNECTED state may include only an MBS session identifier without corresponding MBS configuration information for the MBS session.

In some yet other embodiments of the present disclosure, the indication information may include an MBS change indication in a short message for indicating whether MBS configuration information changes and an MBS state indication in a paging message associated with the short message. The MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session.

In some other embodiments of the present disclosure, the indication information may include an MBS state indication per session in a short message.

In some yet other embodiments of the present disclosure, the indication information may include an MBS state indication in MBS configuration information provided in a MCCH. For example, according to some embodiments of the present disclosure, the MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session. According to some other embodiments of the present disclosure, the MBS state indication for indicating that the UE should enter the RRC_CONNECTED state may include only an MBS session identifier without corresponding MBS configuration information for the MBS session.

In some yet other embodiments of the present disclosure, the indication information may include a paging cause indication in a paging message.

In some embodiments of the present disclosure, the method may include transmitting the indication information to a set of neighbor base stations in the case that the UE is in the RRC_INACTIVE state. The indication information may include at least one of an MBS change indication or an MBS state indication. The MBS state indication may include a per session MBS state indication for indicating that the UE should enter the RRC_CONNECTED state for reception of a corresponding MBS session or the UE should stay in the RRC_INACTIVE state for reception of a corresponding MBS session.

In some other embodiments of the present disclosure, the method may include: receiving MBS related UE information from a last serving base station of the UE in the case that the UE is in the RRC_INACTIVE state; and determining whether the UE should enter the RRC_CONNECTED state based on the MBS related UE information. The MBS related UE information may include MBS session start related information associated with the at least one MBS session and UE radio access network (RAN) paging related information.

In some embodiments of the present disclosure, the method may include: determining whether the UE should enter the RRC_CONNECTED state based on received MBS information; and transmitting the indication information to a distributed unit (DU) of a base station. The indication information may include an MBS state indication. The MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session.

In some other embodiments of the present disclosure, the method may include: determining whether the UE should enter the RRC_CONNECTED state based on received MBS information; and transmitting the indication information to the UE. The indication information may include an MBS state indication. The MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session.

In some yet other embodiments of the present disclosure, the method may further include transmitting the MBS state indication to a central unit (CU) of a base station. The method may further include receiving the MBS information from the CU. The MBS information may include MBS session start related information associated with the at least one MBS session.

According to some embodiments of the present disclosure, a method may include: receiving indication information for indicating whether a UE in an RRC_IDLE state or RRC_INACTIVE state should enter an RRC_CONNECTED state for reception of at least one MBS session; and determining whether to enter the RRC_CONNECTED state in response to the indication information.

In some embodiments of the present disclosure, the indication information is for indicating that the UE should enter the RRC_CONNECTED state for reception of the at least one MBS session, or that the UE should stay in the RRC_IDLE state or RRC_INACTIVE state for reception of the at least one MBS session.

In some embodiments of the present disclosure, the indication information may include an MBS state indication in a short message associated with a group paging for the at least one MBS session.

In some other embodiments of the present disclosure, the indication information may include an MBS change indication in a short message for indicating whether MBS configuration information changes and an MBS state indication in the MBS configuration information. The MBS configuration information can be provided in a system information block (SIB).

In some embodiments of the present disclosure, the MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session. In some other embodiments of the present disclosure, the MBS state indication for indicating that the UE should enter the RRC_CONNECTED state may include only an MBS session identifier without corresponding MBS configuration information for the MBS session.

In some yet other embodiments of the present disclosure, the indication information may include an MBS change indication in a short message for indicating whether MBS configuration information changes and an MBS state indication in a paging message associated with the short message. The MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session.

In some other embodiments of the present disclosure, the indication information may include an MBS state indication per session in a short message.

In some yet other embodiments of the present disclosure, the indication information may include an MBS state indication in MBS configuration information provided in a MCCH. For example, according to some embodiments of the present disclosure, the MBS state indication may include a per session MBS state indication for indicating that the UE should enter the RRC_CONNECTED state for reception of a corresponding MBS session or the UE should stay in the RRC_IDLE state or RRC_INACTIVE state for reception of a corresponding MBS session. According to some other embodiments of the present disclosure, the MBS state indication for indicating that the UE should enter the RRC_CONNECTED state may include only an MBS session identifier without corresponding MBS configuration information for the MBS session.

In still some other embodiments of the present disclosure, the indication information may include a paging cause indication in a paging message.

In some embodiments of the present disclosure, the method may include receiving the indication information from a neighbor base station of a last serving base station of the UE in the case that the UE is in the RRC_INACTIVE state.

In some other embodiments of the present disclosure, the method may include: receiving the indication information from a DU of a base station.

According to some embodiments of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3rd Generation Partnership Project (3GPP) 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1:
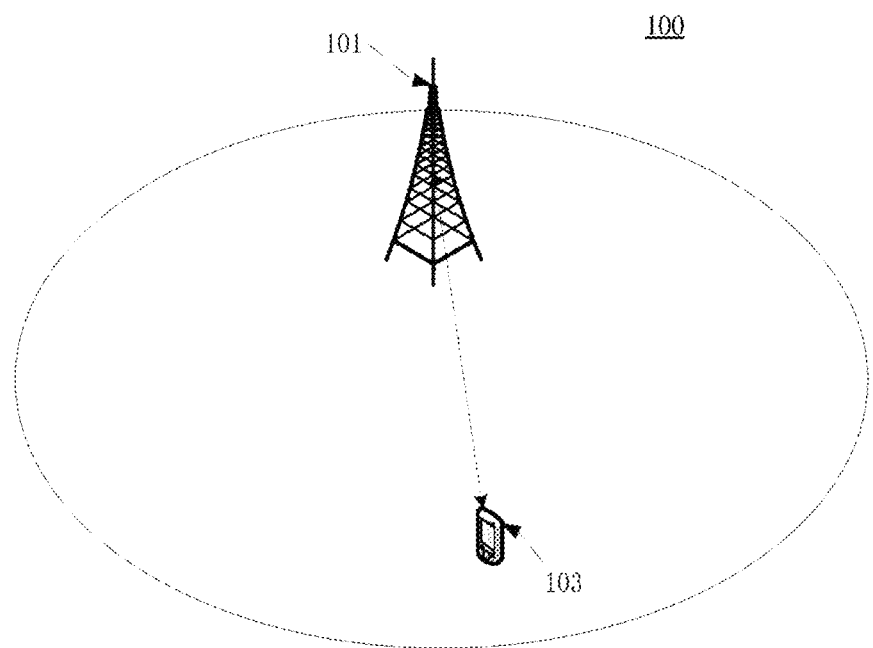
FIG. 1 illustrates a schematic diagram of an exemplary wireless communication system according to some embodiments of the present disclosure.

FIG. 1 illustrates a schematic diagram of an exemplary wireless communication system 100 according to some embodiments of the present disclosure.

As shown in FIG. 1, the wireless communication system 100 can include at least one base station (BS) 101 and at least one UE 103. Although a specific number of BSs 101 and UEs 103, e.g., only one BS 101 and one UE 103, are depicted in FIG. 1, one skilled in the art will recognize that any number of BSs 101 and UEs 103 may be included in the wireless communication system 100.

The wireless communication system 100 can be compatible with any type of network that is capable of sending and receiving wireless communication signals. For example, the wireless communication system 100 can be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks. The BS 101 and the UE 103 may support communication based on, for example, 3G, LTE, LTE-advanced (LTE-A), NR, or other suitable protocol(s).

The BS 101 may be distributed over a geographic region, and generally be a part of a radio access network (RAN) that may include one or more controllers communicably coupled to one or more corresponding BS s 101. In some embodiments of the present disclosure, the BS 101 may also be referred to as an access point, an access terminal, a base, a macro cell, a Node-B, an evolved Node B (eNB), a gNB, a Home Node-B, a relay node, a device, or described using other terminology used in the art.

According to some embodiments of the present disclosure, the UE 103 may be or include a computing device, such as a desktop computer, a laptop computer, a personal digital assistant (PDA), a tablet computer, a smart television (e.g., a television connected to the Internet), a set-top box, a game console, a security system (including a security camera), a vehicle on-board computer, a network device (e.g., a router, a switch, or a modem), or the like. According to some other embodiments of the present disclosure, the UE 103 may be or include a portable wireless communication device, a smart phone, a cellular telephone, a flip phone, a device having a subscriber identity module, a personal computer, a selective call receiver, or any other device that is capable of sending and receiving communication signals on a wireless network. In addition, the UE 103 may also be referred to as a subscriber unit, a mobile, a mobile station, a user, a terminal, a mobile terminal, a wireless terminal, a fixed terminal, a subscriber station, a user terminal, or a device, or described using other terminology used in the art.

The work item on NR support of MBS was agreed in Release 17 (e.g., RP-201038), wherein three RRC states, i.e., RRC_IDLE state, RRC_INACTIVE state, and RRC_CONNECTED state will be supported according to the following objectives:

Specify RAN basic functions for broadcast/multicast for UEs in RRC_CONNECTED state; and Specify RAN basic functions for broadcast/multicast for UEs in RRC_IDLE/RRC_INACTIVE states.

Specifically, for RRC_CONNECTED state and multicast services with high QoS requirement, MBS configuration information is provided to a UE by RRC dedicated signaling directly.

For RRC_IDLE state and RRC_INACTIVE state, NR MBS may use an LTE single carrier (SC) point to multipoint (PTM) like scheme. According to the LTE SC-PTM like scheme (also referred to as "MCCH based solution"), the MCCH will carry the MBS configuration information, e.g., an MBS Configuration message which indicates the active MBS sessions and the scheduling information for each session (or bearer). The scheduling information may include one or more of: scheduling period, scheduling window, and start offset, etc. The information on the MCCH will be periodically transmitted using a configurable repetition period. In addition, MBS user data will be carried by a multicast traffic channel (MTCH) logical channel. Usually, the MCCH configuration is provided by system information, e.g., in a system information block (SIB), which may contain at least one of MCCH modification period, MCCH repetition period, and MCCH subframe offset, etc. A notification mechanism (e.g., an MCCH change notification) is used to announce change(s) in the information on the MCCH.

As another option, NR MBS may use a BCCH based solution for RRC_IDLE state and RRC_INACTIVE state. According to the BCCH based solution, the MBS configuration information will be provided by system information, e.g., in the BCCH. In addition, MBS user data will be carried by the MTCH logical channel. A notification mechanism (e.g., paging) is used to announce change(s) in the MBS configuration information.

In addition, NR Paging is specified in 3GPP specifications such as TS 38.212 and TS 38.300 to allow the network side to reach UE(s) in RRC_IDLE state or RRC_INACTIVE state through paging messages, and to notify UE(s) in RRC_IDLE state, RRC_INACTIVE state, or RRC_CONNECTED state of system information change and earthquake and tsunami warning system (ETWS) or commercial mobile alert system (CMAS) indications through short messages. Both the paging message and the short message are addressed with paging radio network temporary identity (P-RNTI) on a physical downlink control channel (PDCCH). The paging message is sent on a paging control channel (PCCH) or a physical downlink shared channel (PDSCH), while the short message is sent over the PDCCH directly.

More specifically, the paging message is used for mobile terminated (MT) call(s). For example, as defined in 3GPP specification TS 38.331, each paging record in the paging message includes a UE identity for the UE subject to the MT call.

The short message is carried in a short message field in downlink control information (DCI) format 1_0, which is defined in Table 1 as follows in TS 38.331, clause 6.5:

TABLE 1

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Not used in this release of the specification, and shall be ignored by UE if received. |

Regarding NR MBS delivery, there are two modes, i.e., delivery mode 1 and delivery mode 2. Delivery mode 1 is provided in the case that high QoS (e.g., high reliability, low latency, etc.) is required for an MBS session, and is available to a UE in RRC_CONNECTED state. Delivery mode 2 is provided in the case that high QoS is not required for an MBS session. A UE in RRC_IDLE state or RRC_INACTIVE state can also receive data in the delivery mode 2.

In some cases, a UE may need to be notified to enter RRC_CONNECTED state or to stay in RRC_IDLE or RRC_INACTIVE state for receiving a particular MBS session. For example, the UE may have joined a multicast group before the MBS session starts, and in the meantime the UE may have entered RRC_INACTIVE or RRC_IDLE state. When the MBS session starts, the UE may either enter RRC_CONNECTED state or stay in RRC_INACTIVE or RRC_IDLE state for data reception of the MBS session according to the QoS requirements of the MBS session. As another example, when there is no data transmission for a while after an MBS session starts, the network side may send the UE to RRC_INACTIVE or RRC_IDLE state for UE power saving purpose. When data arrives again, the UE should enter RRC_CONNETED state again for data reception of the MBS session.

Embodiments of the present disclosure provide various solutions, which will be described below, at least for notifying a UE to enter RRC_CONNECTED state or to stay in RRC_IDLE or RRC_INACTIVE state for receiving an MBS session.

Figure 2:
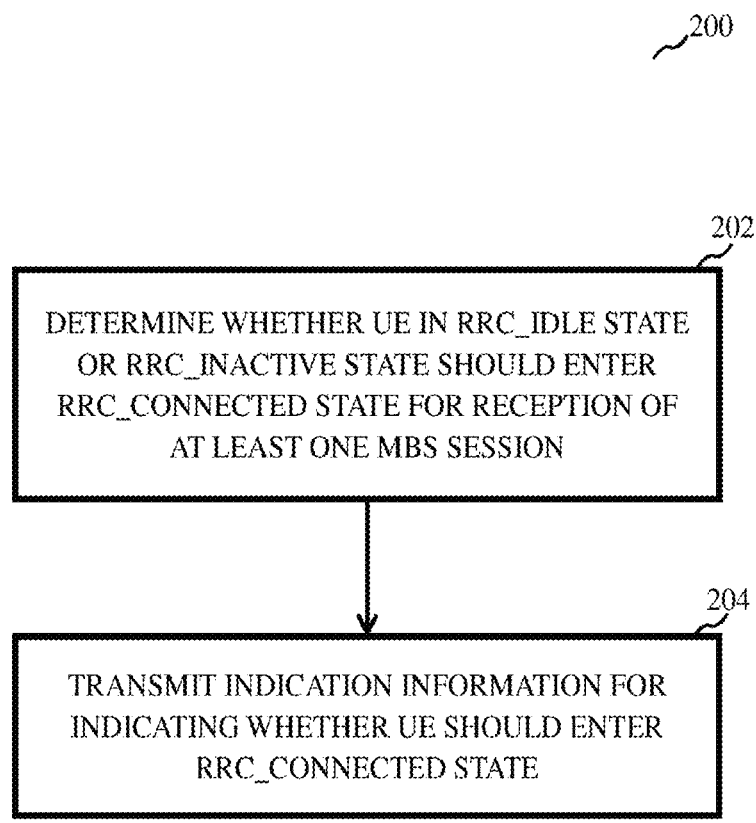
FIG. 2 illustrates a flow chart of an exemplary method for MBS according to some embodiments of the present disclosure.

FIG. 2 illustrates a flow chart of an exemplary method 200 for MBS according to some embodiments of the present disclosure. The method can be performed in the network side, for example by a BS (e.g., the BS 101 illustrated in FIG. 1) or a device with similar functions.

As shown in FIG. 2, in step 202, the BS may determine whether a UE in RRC_IDLE state or RRC_INACTIVE state should enter RRC_CONNECTED state for reception of at least one MBS session. In some embodiments of the present disclosure, the determination can be made based on QoS requirements of the at least one MBS session. For example, when an MBS session requires high QoS, the BS may determine that the UE should enter RRC_CONNECTED state for reception of the MBS session. When an MBS session does not require high QoS, the BS may determine that the UE should stay in RRC_IDLE state or RRC_INACTIVE state for reception of the MBS session, rather than enter RRC_CONNECTED state.

In step 204, the BS may transmit indication information for indicating whether the UE should enter RRC_CONNECTED state, e.g., based on the determination made in step 202. In some embodiments of the present disclosure, the indication information may explicitly indicate that the UE should enter RRC_CONNECTED state for reception of the at least one MBS session, or that the UE should stay in RRC_IDLE state or RRC_INACTIVE state for reception of the at least one MBS session. In some other embodiments of the present disclosure, the indication information may be an implicit indication. For example, there may be an association between an MBS session identified by a temporary mobile group identity (TMGI) or group RNTI (G-RNTI) and the corresponding RRC state (RRC_CONNECTED state, or RRC_IDLE or RRC_INACITVE state) for receiving the MBS session. Such association may be, for example, preconfigured or provided to the UE during the MBS session joining or registration procedure. In these cases, whether the UE should enter the RRC_CONNECTED state for reception of an MBS session can be implicitly indicated by the TMGI or G-RNTI associated with the MBS session.

According to some embodiments of the present disclosure, in step 204, the indication information can be transmitted to the UE. The BS may transmit the indication information to the UE in various manners. Some non-limiting examples are described below.

In some embodiments of the present disclosure, when group paging is used for an MBS session, the indication information transmitted from the BS to the UE may include an MBS state indication in a short message associated with the group paging. Since the group paging is associated with the MBS session (for example, the group paging is scrambled by the G-RNTI associated with the MBS session), the MBS state indication in the short message associated with the group paging can be used to indicate whether the UE should enter RRC_CONNECTED state for reception of the associated MBS session.

For example, the short message including an MBS state indication field may be defined in Table 2 as follows:

TABLE 2

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | mbsStateIndication<br>If set to 1: RRC_CONNECTED is preferred/required for the MBS Session |
| 4-8 | Not used in this release of the specification, and shall be ignored by UE if received. |

In this example, Bit 3 in the short message is the MBS state indication. The BS may set Bit 3 in the short message to "1" to indicate that the UE should enter the RRC_CONNECTED state, and may set Bit 3 in the short message to "0" to indicate that the UE should stay in the RRC_IDLE state or RRC_INACITVE state. In other examples, the MBS state indication in the short message may have more than one bit. For example, the MBS state indication having a value of "10" may indicate that the UE should enter RRC_CONNECTED state, and the MBS state indication having a value of "01" may indicate that the UE should stay in the RRC_IDLE state or RRC_INACITVE state. In other examples, the short message can be defined in other formats.

In some other embodiments of the present disclosure, the indication information transmitted from the BS to the UE may include a combination of an MBS change indication and an MBS state indication. The MBS change indication is provided in a short message to indicate whether MBS configuration information changes. The MBS state indication is provided in the MBS configuration information. According to an embodiment of the present disclosure, the MBS configuration information is provided in a SIB. The MBS configuration information may include, for example, a list of active MBS sessions, which includes the MBS session identifier (e.g., TMGI) of each active MBS session, and scheduling information (i.e., corresponding MBS configuration information) for each MBS session in the list of active MBS sessions.

For example, the short message including an MBS change indication field may be defined in Table 3 as follows:

TABLE 3

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | mbsChangeIndication<br>If set to 1: Indication of MBS Configuration Change |
| 4-8 | Not used in this release of the specification, and shall be ignored by UE if received. |

In this example, Bit 3 in the short message is the MBS change indication. The BS may set Bit 3 in the short message to "1" to indicate that the MBS configuration information changes. The MBS change indication can indicate any changes of the MBS configuration information, including but not limited to the existence of the MBS state indication in the MBS configuration information. For example, the changes may also include addition or deletion of an MBS session in the list of active MBS sessions, any changes in the scheduling information for one or more MBS sessions, etc. In other examples, the MBS change indication in the short message may have more than one bit. For example, each value of the MBS change indication may correspond to a kind of changes in the MBS configuration information. In other examples, the short message can be defined in other formats.

According to some embodiments of the present disclosure, the MBS state indication in the MBS configuration information may include a per session MBS state indication for indicating that the UE should enter RRC_CONNECTED state for reception of a corresponding MBS session or the UE should stay in RRC_IDLE state or RRC_INACTIVE state for reception of a corresponding MBS session. That is, for each MBS session in the list of active MBS sessions, there is a corresponding MBS state indication in the corresponding MBS configuration information to indicate whether the UE should enter RRC_CONNECTED state for reception of the MBS session.

According to some other embodiments of the present disclosure, the MBS state indication in the MBS configuration information may be implicit. For example, for an MBS session in the list of active MBS sessions, only an MBS session identifier without corresponding MBS configuration information for the MBS session is included in the MBS configuration information, that is, the MBS configuration information only provides the identifier of the MBS session but not provide the corresponding MBS configuration information for the MBS session. Such MBS configuration information may implicitly indicate that the UE should enter the RRC_CONNECTED state for reception of the MBS session. On the other hand, when both the MBS session identifier and corresponding MBS configuration information for the MBS session are included in the MBS configuration information, such MBS configuration information may implicitly indicate that the UE should stay in the RRC_IDLE state or RRC_INACITVE state for reception of the MBS session.

In some other embodiments of the present disclosure, the indication information transmitted from the BS to the UE may include a combination of an MBS change indication in a short message to indicate whether MBS configuration information changes and an MBS state indication in a paging message associated with the short message. The short message may include an MBS change indication field, as described above. According to some embodiments of the present disclosure, the MBS state indication in the paging message may include a per session MBS state indication for indicating that the UE should enter RRC_CONNECTED state for reception of a corresponding MBS session or the UE should stay in RRC_IDLE state or RRC_INACTIVE state for reception of a corresponding MBS session.

In some other embodiments of the present disclosure, the indication information transmitted from the BS to the UE may include an MBS state indication per session in a short message. For example, the short message may include both an MBS session identifier of an MBS session and a corresponding MBS state indication to indicate whether the UE should enter the RRC_CONNECTED state for reception of the MBS session.

In some other embodiments of the present disclosure, the indication information transmitted from the BS to the UE may include an MBS state indication in MBS configuration information provided in the MCCH. For example, the BS may announce a change in the information on the MCCH by, e.g., an MCCH change notification, and then add an MBS state indication in the MBS configuration information provided in the MCCH. The MBS configuration information may include, for example, a list of active MBS sessions, which includes the MBS session identifier (e.g., TMGI) of each active MBS session, and scheduling information (i.e., corresponding MBS configuration information) for each MBS session in the list of active MBS sessions.

According to some embodiments of the present disclosure, the MBS state indication in the MBS configuration information may include a per session MBS state indication for indicating that the UE should enter RRC_CONNECTED state for reception of a corresponding MBS session or the UE should stay in RRC_IDLE state or RRC_INACTIVE state for reception of a corresponding MBS session. That is, for each MBS session in the list of active MBS sessions, there is a corresponding MBS state indication in the corresponding MBS configuration information to indicate whether the UE should enter RRC_CONNECTED state for reception of the MBS session.

According to some other embodiments of the present disclosure, the MBS state indication in the MBS configuration information may be implicit. For example, for an MBS session in the list of active MBS sessions, only an MBS session identifier without corresponding MBS configuration information for the MBS session is included in the MBS configuration information, that is, the MBS configuration information only provides the identifier of the MBS session but not provide the corresponding MBS configuration information for the MBS session. Such MBS configuration information may implicitly indicate that the UE should enter RRC_CONNECTED state for reception of the MBS session. On the other hand, when both the MBS session identifier and corresponding MBS configuration information for the MBS session are included in the MBS configuration information, such MBS configuration information may implicitly indicate that the UE should stay in RRC_IDLE state or RRC_INACITVE state for reception of the MBS session.

In some other embodiments of the present disclosure, the indication information transmitted from the BS to the UE may include a paging cause indication in a paging message. For example, when the BS determines that the UE should enter RRC_CONNECTED state for reception of an MBS session, the BS may provide a corresponding paging cause indication in a paging message associated with the MBS session to indicate that the UE should enter RRC_CONNECTED state for reception of the MBS session.

According to the current 3GPP specifications, a UE in RRC_INACITVE state remains in a connection management state called CM-CONNECTED with the serving access and mobility management function (AMF) of a core network (e.g., 5G core network), and can move within an area configured by the RAN without notifying the RAN. Such an area is called "an RAN-based notification area (RNA)." The last BS serving the UE before the UE enters RRC_INACITVE state, which is also referred to as the last serving BS of the UE, may keep the UE context and the UE-associated connection information with the AMF and user plane function (UPF) of the core network. The last serving BS may receive downlink data from the UPF or downlink UE-associated signalling from the AMF (except the UE Context Release Command message) while the UE is in RRC_INACTIVE state. The last serving BS may page the UE in the cells corresponding to the RNA and may send an XnAP RAN paging message to one or more neighbour BS having cells in the RNA via the Xn interface between the last serving BS and the one or more neighbour BS. Accordingly, the one or more neighbour BS can page the UE in their cells and the UE can receive the paging message even if the UE has moved to a cell of a neighbour BS in the RNA.

According to some embodiments of the present disclosure, in the case that the UE is in RRC_INACITVE state, the indication information for indicating whether the UE should enter RRC_CONNECTED state can be transmitted from the last serving BS of the UE to a set of neighbour BS of the last serving BS of the UE via the Xn interface between the last serving BS and the set of neighbour BS in step 204. The indication information may be provided in an XnAP RAN paging message and may include at least one of an MBS change indication or an MBS state indication. The MBS state indication may include a per session MBS state indication for indicating that the UE should enter RRC_CONNECTED state for reception of a corresponding MBS session or the UE should stay in RRC_INACTIVE state for reception of a corresponding MBS session.

In these embodiments, the last serving BS may receive MBS session start related information (e.g., an MBS session start message) or data of an MBS session from the core network, determine whether the UE in RRC_INACTIVE state should enter RRC_CONNECTED state for reception of the MBS session, and then transmit the indication information based on the determination to the set of neighbour BS. When the neighbour BS receives the indication information, it may transmit the indication information to the UE in any manner as described above.

According to some other embodiments of the present disclosure, it is a neighbour BS of the last serving BS of the UE in RRC_INACTIVE state that determines whether the UE in RRC_INACTIVE state should enter RRC_CONNECTED state for reception of an MBS session. In these embodiments, the last serving BS may receive MBS session start related information (e.g., an MBS session start message) or data of an MBS session from the core network, and then sends MBS related UE information to the neighbor BS. The MBS related UE information may include the MBS session start related information and UE RAN paging related information (e.g., UE RAN paging identity). When the neighbour BS receives the MBS related UE information, it may determine whether the UE should enter RRC_CONNECTED state for reception of the MBS session and transmit indication information (e.g., an MBS change indication and/or an MBS state indication) based on the determination to the UE in any manner as described above.

Figure 3:
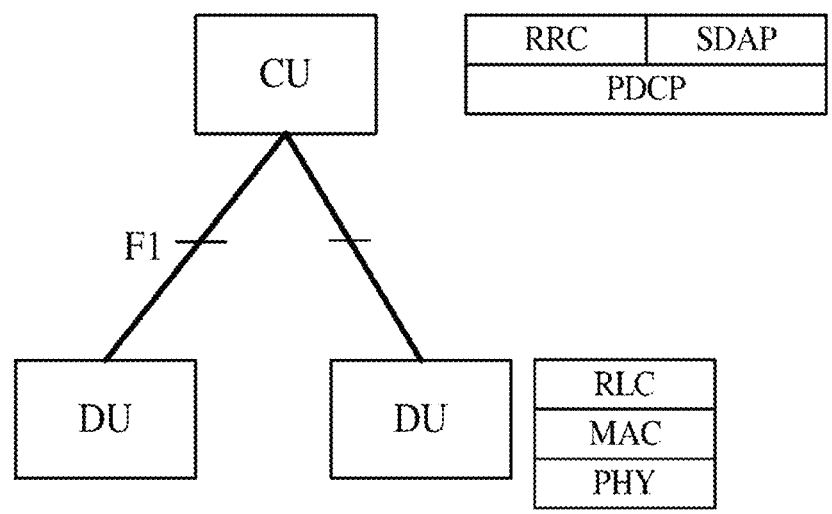
FIG. 3 illustrates an exemplary base station split into central unit (CU) and distributed unit (DU)

Depending on deployment, the internal structure of a BS (e.g., gNB) may be split into two parts called central unit (CU) and distributed unit (DU), as shown in FIG. 3. The CU and DU of the BS are connected via an F1 interface. The F1 Application Protocol (F1AP) supports functions of the F1 interface by certain F1AP signaling procedures. The CU hosts RRC, service data adaptation protocol (SDAP) and packet data convergence protocol (PDCP) layers of the BS. The DU hosts radio link control (RLC) layer, medium access control (MAC) layer and physical layer (PHY) of the BS. The BS may include one CU and one or more DUs. Two DUs are illustrated in FIG. 3 as a non-limiting example.

According to some embodiments of the present disclosure, the CU of a BS may determine whether a UE in RRC_IDLE state or RRC_INACTIVE state should enter RRC_CONNECTED state for reception of at least one MBS session, and transmit indication information for indicating whether the UE should enter RRC_CONNECTED state based on the determination to the DU(s) of the BS. The indication information may include an MBS state indication. The MBS state indication may include a per session MBS state indication for indicating that the UE should enter RRC_CONNECTED state for reception of a corresponding MBS session or the UE should stay in RRC_IDLE state or RRC_INACTIVE state for reception of a corresponding MBS session.

In these embodiments, the CU of the BS may receive MBS information (e.g., MBS session start related information or data of an MBS session) from the core network, determine whether the UE should enter RRC_CONNECTED state for reception of the MBS session (e.g., based on the MBS information), and then transmit the indication information based on the determination to the DU(s) of the BS via the F1 interface. When the DU receives the indication information, it may transmit a corresponding MBS change indication and/or MBS state indication to the UE in any manner as described above.

According to some other embodiments of the present disclosure, it is the DU of the BS that determines whether the UE should enter RRC_CONNECTED state for reception of an MBS session. In these embodiments, the CU of the BS may receive MBS information (e.g., MBS session start related information or data of an MBS session) from the core network, and then sends the MBS information to the DU. When the DU receives the MBS information, it may determine whether the UE should enter RRC_CONNECTED state for reception of the MBS session based on the MBS information, and transmit indication information (e.g., an MBS change indication and/or an MBS state indication) based on the determination to the UE in any manner as described above. In response to that, the DU may also transmit the MBS state indication to the CU. The MBS state indication may include a per session MBS state indication for indicating that the UE should enter RRC_CONNECTED state for reception of a corresponding MBS session or the UE should stay in RRC_IDLE state or RRC_INACTIVE state for reception of a corresponding MBS session.

Figure 4:
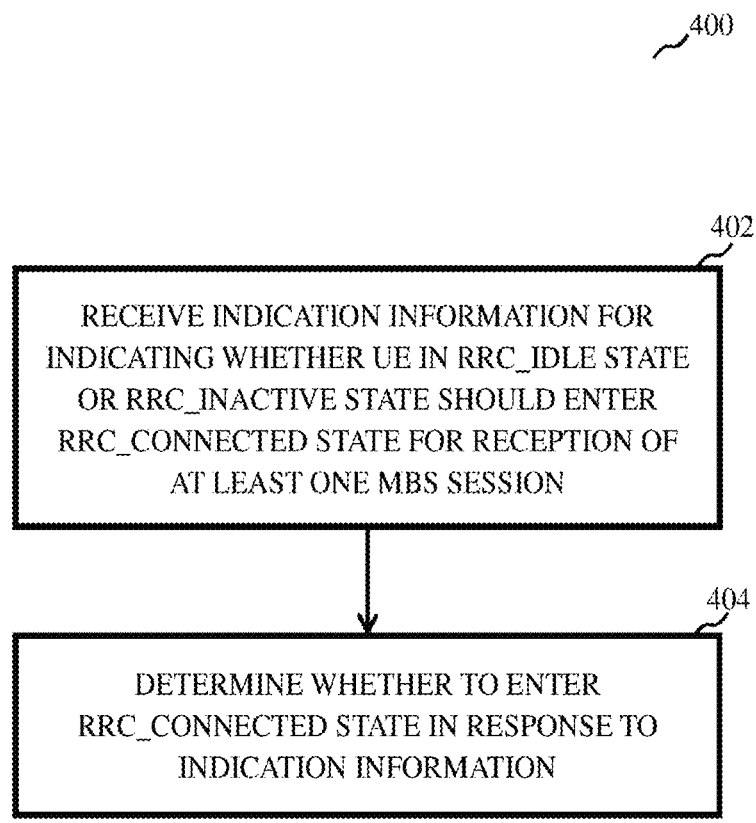
FIG. 4 illustrates a flow chart of an exemplary method for MBS according to some embodiments of the present disclosure.

FIG. 4 illustrates a flow chart of an exemplary method 400 for MBS according to some embodiments of the present disclosure. The method can be performed by a UE (e.g., the UE 103 illustrated in FIG. 1) or a device with similar functions. In particular, the UE is in RRC_IDLE state or RRC_INACTIVE state.

As shown in FIG. 4, in step 402, the UE may receive indication information for indicating whether the UE should enter RRC_CONNECTED state for reception of at least one MBS session. In some embodiments of the present disclosure, the indication information may explicitly indicate that the UE should enter RRC_CONNECTED state for reception of the at least one MBS session, or that the UE should stay in RRC_IDLE state or RRC_INACTIVE state for reception of the at least one MBS session. In some other embodiments of the present disclosure, the indication information may be an implicit indication. For example, there may be an association between an MBS session identified by a TMGI or G-RNTI and the corresponding RRC state (RRC_CONNECTED state, or RRC_IDLE or RRC_INACITVE state) for receiving the MBS session. Such association may be, for example, preconfigured or provided to the UE during the MBS session joining or registration procedure. In these cases, whether the UE should enter RRC_CONNECTED state for reception of an MBS session can be implicitly indicated by the TMGI or G-RNTI associated with the MBS session.

According to some embodiments of the present disclosure, the UE may receive the indication information in various manners. Some non-limiting examples are described below.

In some embodiments of the present disclosure, when group paging is used for an MBS session, the indication information received by the UE may include an MBS state indication in a short message associated with the group paging. For example, the group paging may be scrambled by the G-RNTI associated with the MBS session. When the UE detects the group paging using the G-RNTI, the UE can determine that the associated MBS session is about to start. Then, the UE may identify the MBS state indication in the short message associated with the group paging.

For example, the short message including an MBS state indication field may be defined as the above Table 2, wherein Bit 3 in the short message is the MBS state indication. When Bit 3 in the short message is set to "1," it indicates that the UE should enter RRC_CONNECTED state; otherwise, it indicates that the UE should stay in RRC_IDLE state or RRC_INACITVE state. In other examples, the MBS state indication in the short message may have more than one bit. For example, the MBS state indication having a value of "10" may indicate that the UE should enter RRC_CONNECTED state, and the MBS state indication having a value of "01" may indicate that the UE should stay in RRC_IDLE state or RRC_INACITVE state. In other examples, the short message can be defined in other formats.

In some other embodiments of the present disclosure, the indication information received by the UE may include a combination of an MBS change indication and an MBS state indication. The MBS change indication is provided in a short message to indicate whether MBS configuration information changes. The MBS state indication is provided in the MBS configuration information. According to an embodiment of the present disclosure, the MBS configuration information is provided in a SIB. The MBS configuration information may include, for example, a list of active MBS sessions, which includes the MBS session identifier (e.g., TMGI) of each active MBS session, and scheduling information (i.e., corresponding MBS configuration information) for each MBS session in the list of active MBS sessions.

For example, the short message including an MBS change indication field may be defined as the above Table 3, wherein Bit 3 in the short message is the MBS change indication. When Bit 3 in the short message is set to "1," it indicates that the MBS configuration information changes. In other examples, the MBS change indication in the short message may have more than one bit.

When the UE receives the MBS change indication in the short message indicating that the MBS configuration information changes, it may identify the MBS state indication in the MBS configuration information provided in a SIB. According to some embodiments of the present disclosure, the MBS state indication in the MBS configuration information may include a per session MBS state indication for indicating that the UE should enter RRC_CONNECTED state for reception of a corresponding MBS session or the UE should stay in RRC_IDLE state or RRC_INACTIVE state for reception of a corresponding MBS session. That is, for each MBS session in the list of active MBS sessions, there is a corresponding MBS state indication in the corresponding MBS configuration information to indicate whether the UE should enter RRC_CONNECTED state for reception of the MBS session.

According to some other embodiments of the present disclosure, the MBS state indication in the MBS configuration information may be implicit. For example, for an MBS session in the list of active MBS sessions, only an MBS session identifier without corresponding MBS configuration information for the MBS session is included in the MBS configuration information. Such MBS configuration information may implicitly indicate that the UE should enter RRC_CONNECTED state for reception of the MBS session. When both the MBS session identifier and corresponding MBS configuration information for the MBS session are included in the MBS configuration information, the MBS configuration information may implicitly indicate that the UE should stay in RRC_IDLE state or RRC_INACITVE state for reception of the MBS session.

In some other embodiments of the present disclosure, the indication information received by the UE may include a combination of an MBS change indication in a short message to indicate whether MBS configuration information changes and an MBS state indication in a paging message associated with the short message. The short message may include an MBS change indication field, as described above. According to some embodiments of the present disclosure, the MBS state indication in the paging message may include a per session MBS state indication for indicating that the UE should enter RRC_CONNECTED state for reception of a corresponding MBS session or the UE should stay in RRC_IDLE state or RRC_INACTIVE state for reception of a corresponding MBS session.

In some other embodiments of the present disclosure, the indication information received by the UE may include an MBS state indication per session in a short message. For example, the short message may include both an MBS session identifier of an MBS session and a corresponding MBS state indication to indicate whether the UE should enter RRC_CONNECTED state for reception of the MBS session.

In some other embodiments of the present disclosure, the indication information received by the UE may include an MBS state indication in MBS configuration information provided in the MCCH. For example, in response to receiving an MCCH change notification, the UE may identify the MBS state indication in the MBS configuration information provided in the MCCH. The MBS configuration information may include, for example, a list of active MBS sessions, which includes the MBS session identifier (e.g., TMGI) of each active MBS session, and scheduling information (i.e., corresponding MBS configuration information) for each MBS session in the list of active MBS sessions.

According to some embodiments of the present disclosure, the MBS state indication in the MBS configuration information may include a per session MBS state indication for indicating that the UE should enter RRC_CONNECTED state for reception of a corresponding MBS session or the UE should stay in RRC_IDLE state or RRC_INACTIVE state for reception of a corresponding MBS session. That is, for each MBS session in the list of active MBS sessions, there is a corresponding MBS state indication in the corresponding MBS configuration information to indicate whether the UE should enter RRC_CONNECTED state for reception of the MBS session.

According to some other embodiments of the present disclosure, the MBS state indication in the MBS configuration information may be implicit. For example, for an MBS session in the list of active MBS sessions, only an MBS session identifier without corresponding MBS configuration information for the MBS session is included in the MBS configuration information. Such MBS configuration information may implicitly indicate that the UE should enter RRC_CONNECTED state for reception of the MBS session. When both the MBS session identifier and corresponding MBS configuration information for the MBS session are included in the MBS configuration information, the MBS configuration information may implicitly indicate that the UE should stay in RRC_IDLE state or RRC_INACITVE state for reception of the MBS session.

In some other embodiments of the present disclosure, the indication information received by the UE may include a paging cause indication in a paging message.

In some other embodiments of the present disclosure, the UE may receive the indication information from a neighbor BS of the last serving BS of the UE in the case that the UE is in RRC_INACTIVE state.

In some other embodiments of the present disclosure, the UE may receive the indication information from a DU of a BS.

As shown in FIG. 4, in step 404, the UE may determine whether to enter RRC_CONNECTED state in response to the received indication information. For example, when the received indication information explicitly or implicitly indicates that the UE should enter RRC_CONNECTED state for reception of an MBS session, the UE may determine to enter RRC_CONNECTED state to receive the MBS session. The physical layer of the UE may forward the indication information or send an "RRC_CONNECTED required" indication to the upper layer (e.g., RRC layer). When receiving the indication, the upper layer (e.g., RRC layer) initializes an RRC connection setup or RRC connection resume procedure to enter RRC_CONNECTED state. When the received indication information explicitly or implicitly indicates that the UE should stay in RRC_IDLE state or RRC_INACTIVE state for reception of an MBS session, the UE may decide to stay in RRC_IDLE state or RRC_INACTIVE state to receive the MBS session. The physical layer of the UE may send an "RRC_CONNECTED not required" indication or a "staying in RRC_IDLE/RRC_INACTIVE" indication to the upper layer (e.g., RRC layer). When receiving the indication, the upper layer (e.g., RRC layer) acquires the MBS configuration information in the system information or in the MCCH for data reception of the MBS session.

Figure 5:
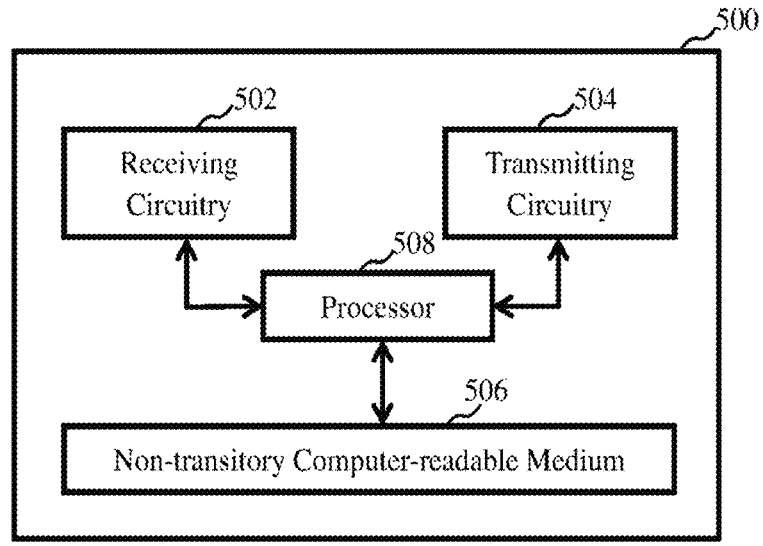
FIG. 5 illustrates an exemplary block diagram of an apparatus according to some embodiments of the present disclosure.

FIG. 5 illustrates an exemplary block diagram of an apparatus 500 according to some embodiments of the present disclosure. In some embodiments of the present disclosure, the apparatus 500 may be or include a BS (e.g., the BS 101 in FIG. 1) or other devices having similar functions. In some embodiments, the apparatus 500 can be configured to perform the method illustrated in FIG. 2.

As shown in FIG. 5, the apparatus 500 may include at least one receiving circuitry 502, at least one transmitting circuitry 504, at least one non-transitory computer-readable medium 506, and at least one processor 508 coupled to the at least one receiving circuitry 502, the at least one transmitting circuitry 504, the at least one non-transitory computer-readable medium 506. While shown to be coupled to each other via the at least one processor 508 in the example of FIG. 5, the at least one receiving circuitry 502, the at least one transmitting circuitry 504, the at least one non-transitory computer-readable medium 506, and the at least one processor 508 may be coupled to one another in various arrangements. For example, the at least one receiving circuitry 502, the at least one transmitting circuitry 504, the at least one non-transitory computer-readable medium 506, and the at least one processor 508 may be coupled to each other via one or more local buses (not shown for simplicity).

Although in FIG. 5, elements such as receiving circuitry 502, transmitting circuitry 504, non-transitory computer-readable medium 506, and processor 508 are described in the singular, the plural is contemplated unless limitation to the singular is explicitly stated. In some embodiments of the present disclosure, the at least one receiving circuitry 502 and the at least one transmitting circuitry 504 may be combined into a single device, such as a transceiver. In certain embodiments of the present disclosure, the apparatus 500 may further include a memory and/or other components.

In some embodiments of the present disclosure, the at least one non-transitory computer-readable medium 506 may have stored thereon computer-executable instructions which are programmed to cause the at least one processor 508 to implement the steps of the methods according to embodiments of the present disclosure, for example as described in view of FIG. 2, with the at least one receiving circuitry 502 and the at least one transmitting circuitry 504. For example, when executed, the instructions may cause the at least one processor 508 to determine whether a UE in an RRC_IDLE state or RRC_INACTIVE state should enter an RRC_CONNECTED state for reception of at least one MBS session. The instructions may further cause the at least one processor 508 to transmit, with the at least one transmitting circuitry 504, indication information for indicating whether the UE should enter RRC_CONNECTED state.

Figure 6:
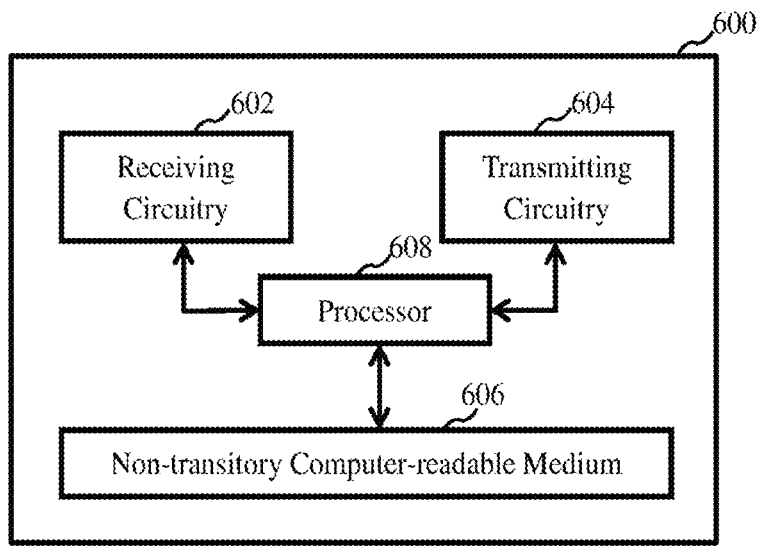
FIG. 6 illustrates an exemplary block diagram of another apparatus according to some embodiments of the present disclosure.

FIG. 6 illustrates an exemplary block diagram of an apparatus 600 according to some embodiments of the present disclosure. In some embodiments of the present disclosure, the apparatus 600 may be or include a UE (e.g., the UE 103 in FIG. 1) or other devices having similar functionality. In some embodiments, the apparatus 600 can be configured to perform the method illustrated in FIG. 4.

As shown in FIG. 6, the apparatus 600 may include at least one receiving circuitry 602, at least one transmitting circuitry 604, at least one non-transitory computer-readable medium 606, and at least one processor 608 coupled to the at least one receiving circuitry 602, the at least one transmitting circuitry 604, the at least one non-transitory computer-readable medium 606. While shown to be coupled to each other via the at least one processor 608 in the example of FIG. 6, the at least one receiving circuitry 602, the at least one transmitting circuitry 604, the at least one non-transitory computer-readable medium 606, and the at least one processor 608 may be coupled to one another in various arrangements. For example, the at least one receiving circuitry 602, the at least one transmitting circuitry 604, the at least one non-transitory computer-readable medium 606, and the at least one processor 608 may be coupled to each other via one or more local buses (not shown for simplicity).

Although in FIG. 6, elements such as receiving circuitry 602, transmitting circuitry 604, non-transitory computer-readable medium 606, and processor 608 are described in the singular, the plural is contemplated unless limitation to the singular is explicitly stated. In some embodiments of the present disclosure, the at least one receiving circuitry 602 and the at least one transmitting circuitry 604 may be combined into a single device, such as a transceiver. In certain embodiments of the present disclosure, the apparatus 600 may further include an input device, a memory, and/or other components.

In some embodiments of the present disclosure, the at least one non-transitory computer-readable medium 606 may have stored thereon computer-executable instructions which are programmed to cause the at least one processor 608 to implement the steps of the methods according to embodiments of the present disclosure, for example as described in view of FIG. 4, with the at least one receiving circuitry 602 and the at least one transmitting circuitry 604. For example, when executed, the instructions may cause the at least one processor 608 to receive, with the at least one receiving circuitry 602, indication information for indicating whether a UE in an RRC_IDLE state or RRC_INACTIVE state should enter an RRC_CONNECTED state for reception of at least one MBS session. The instructions may further cause the at least one processor 608 to determine whether to enter RRC_CONNECTED state in response to the indication information.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A method performed by a network entity, the method comprising:
   determining whether a user equipment (UE) in a radio resource control (RRC) state of an RRC_IDLE state or an RRC_INACTIVE state should enter an RRC_CONNECTED state for reception of at least one multicast and broadcast services (MBS) session; and
   transmitting, to the UE, indication information for indicating whether the UE should enter the RRC_CONNECTED state, the indication information causing the UE to receive the at least one MBS session.

2. The method of claim 1, wherein the indication information indicates that the UE should enter the RRC_CONNECTED state for reception of the at least one MBS session, or that the UE should stay in the RRC_IDLE state or the RRC_INACTIVE state for the reception of the at least one MBS session.

3. The method of claim 1, wherein the indication information comprises an MBS change indication in a short message for indicating whether MBS configuration information changes and includes an MBS state indication in the MBS configuration information.

4. The method of claim 3, wherein the MBS state indication comprises a per session MBS state indication for indicating that the UE should enter the RRC_CONNECTED state for reception of a corresponding MBS session or the UE should stay in the RRC_IDLE state or the RRC_INACTIVE state for the reception of the corresponding MBS session.

5. The method of claim 1, wherein the indication information comprises an MBS state indication in MBS configuration information provided in a multicast control channel (MCCH).

6. The method of claim 1, further comprising transmitting the indication information to a set of neighbor base stations if the UE is in the RRC_INACTIVE state.

7. The method of claim 1, further comprising:
   receiving MBS related UE information from a last serving base station of the UE if the UE is in the RRC_INACTIVE state; and
   determining whether the UE should enter the RRC_CONNECTED state based on the MBS related UE information.

8. The method of claim 1, further comprising:
   determining whether the UE should enter the RRC_CONNECTED state based on received MBS information; and at least one of:
      transmitting the indication information to a distributed unit (DU) of a base station; or
      transmitting the indication information to the UE.

9. The method of claim 8, further comprising receiving the MBS information from a central unit (CU) of the base station.

10. A user equipment (UE) for wireless communication, comprising:
    at least one memory; and
    at least one processor coupled with the at least one memory and configured to cause the UE to:
       receive indication information that indicates whether the UE in a radio resource control (RRC) state of an RRC IDLE state or RRC_INACTIVE state should enter an RRC_CONNECTED state for reception of at least one multicast and broadcast services (MBS) session; and
       determine whether to enter the RRC_CONNECTED state based at least in part on the indication information, the indication information causing the UE to receive the at least one MBS session.

11. The UE of claim 10, wherein the indication information indicates that the UE should enter the RRC_CONNECTED state for reception of the at least one MBS session, or that the UE should stay in the RRC_IDLE state or the RRC_INACTIVE state for the reception of the at least one MBS session.

12. The UE of claim 10, wherein the indication information comprises an MBS change indication in a short message for indicating whether MBS configuration information changes and an MBS state indication in the MBS configuration information.

13. The UE of claim 10, wherein the indication information comprises an MBS state indication in MBS configuration information provided in a multicast control channel (MCCH).

14. A network entity for wireless communication, comprising:
    at least one memory; and
    at least one processor coupled with the at least one memory and configured to cause the network entity to:
       determine whether a user equipment (UE) in a radio resource control (RRC) state of an RRC_IDLE state or an RRC_INACTIVE state should enter an RRC_CONNECTED state for reception of at least one multicast and broadcast services (MBS) session; and
       transmit indication information that indicates whether the UE should enter the RRC_CONNECTED state, the indication information causing the UE to receive the at least one MBS session.

15. The network entity of claim 14, wherein the indication information indicates that the UE should enter the RRC_CONNECTED state for reception of the at least one MBS session, or that the UE should stay in the RRC_IDLE state or the RRC_INACTIVE state for the reception of the at least one MBS session.

16. The network entity of claim 14, wherein the indication information includes an MBS change indication in a short message for indicating whether MBS configuration information changes and includes an MBS state indication in the MBS configuration information.

17. The network entity of claim 14, wherein the indication information includes an MBS state indication in MBS configuration information provided in a multicast control channel (MCCH).

18. The network entity of claim 14, wherein the at least one processor is configured to cause the network entity to transmit the indication information to a set of neighbor base stations if the UE is in the RRC_INACTIVE state.

19. The network entity of claim 14, wherein the at least one processor is configured to cause the network entity to:
   receive MBS related UE information from a last serving base station of the UE if the UE is in the RRC_INACTIVE state; and
   determine whether the UE should enter the RRC_CONNECTED state based on the MBS related UE information.

20. The network entity of claim 14, wherein the at least one processor is configured to cause the network entity to:
   determine whether the UE should enter the RRC_CONNECTED state based on received MBS information; and at least one of:
   transmit the indication information to a distributed unit (DU) of a base station; or
   transmit the indication information to the UE.

* * * * *